April 14, 1942. W. R. GRISWOLD 2,279,986
MOTOR VEHICLE
Filed May 13, 1938 5 Sheets-Sheet 2
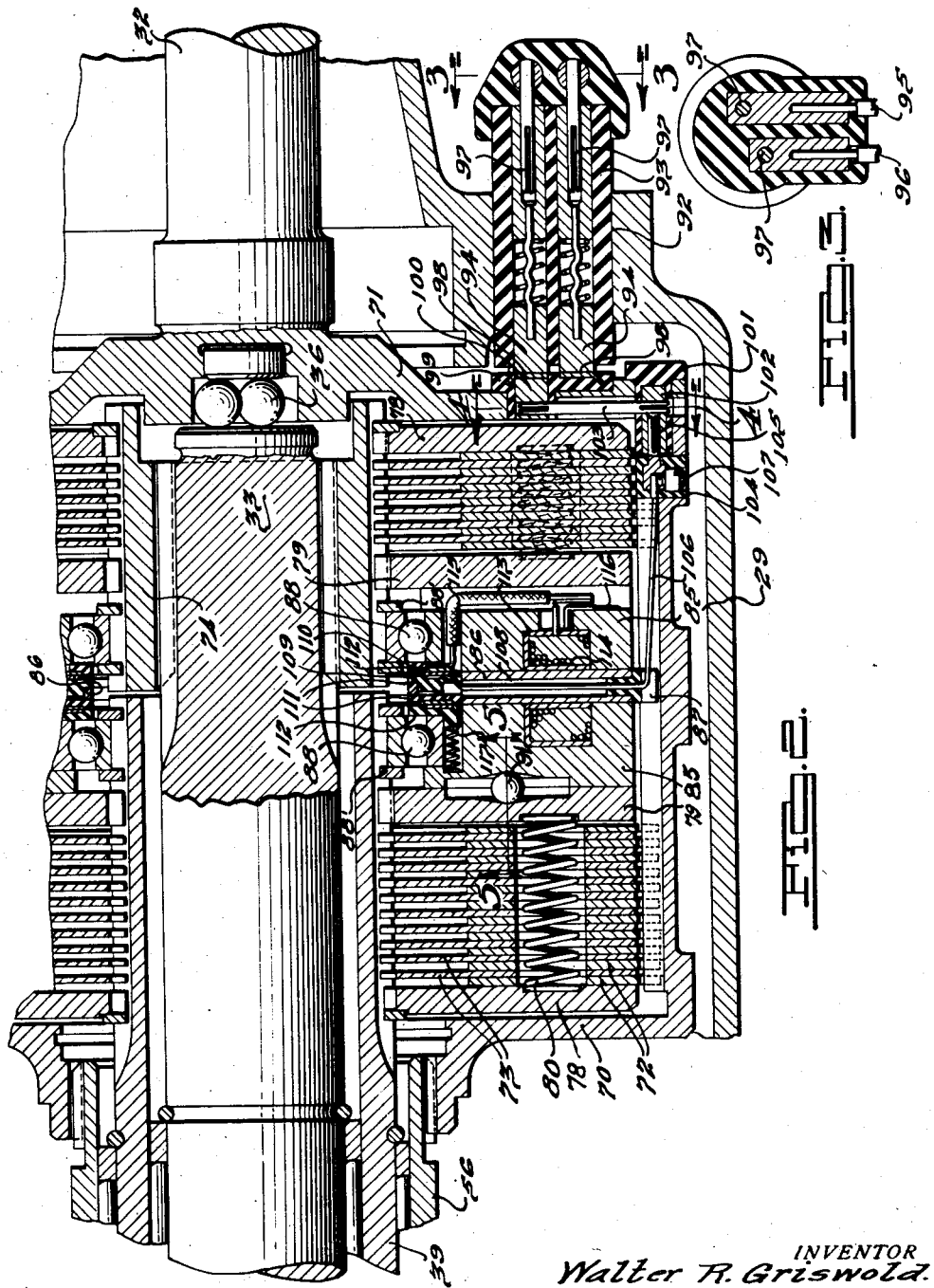
INVENTOR
Walter R. Griswold.
BY
Sibbette + Hart
ATTORNEYS.

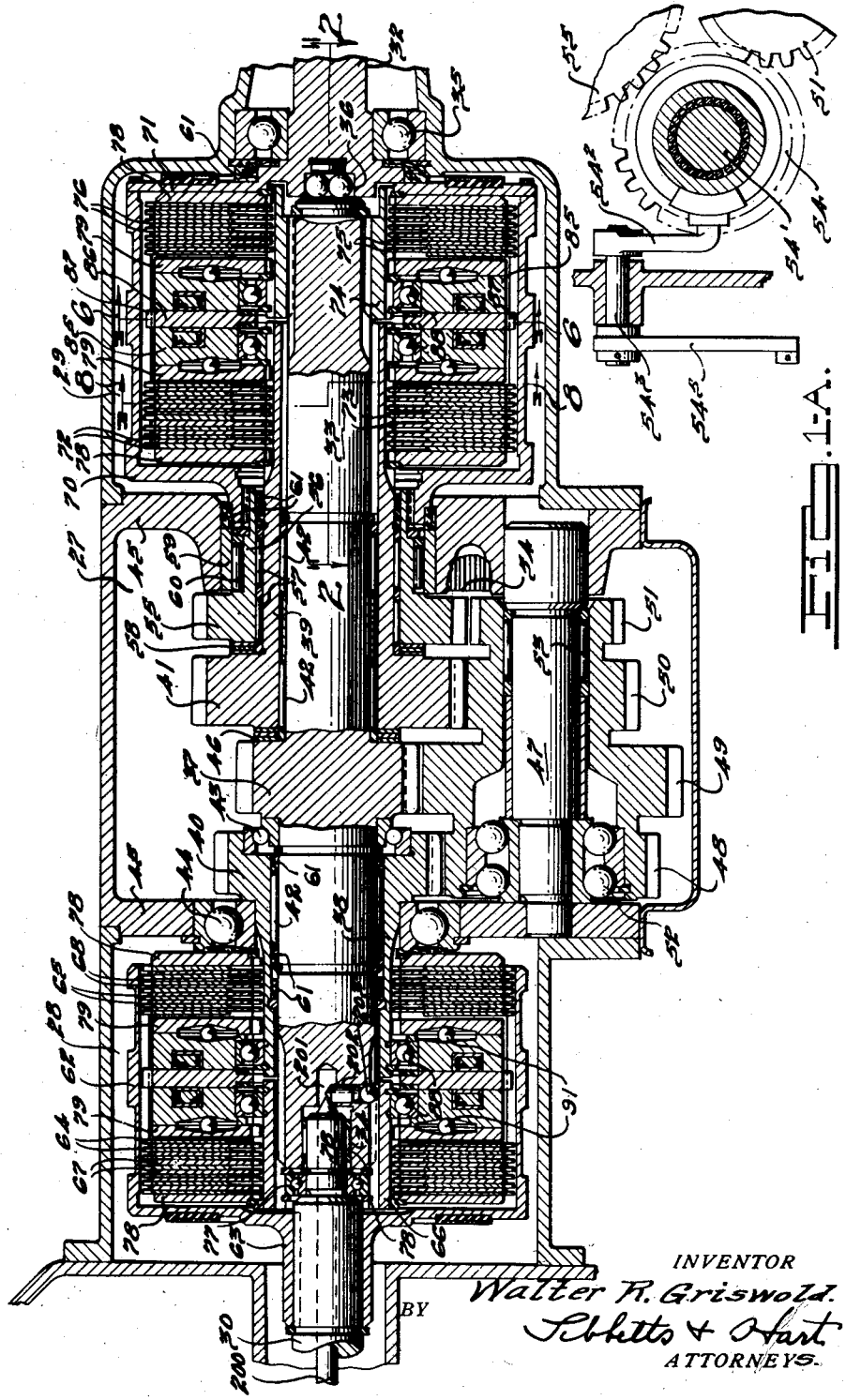

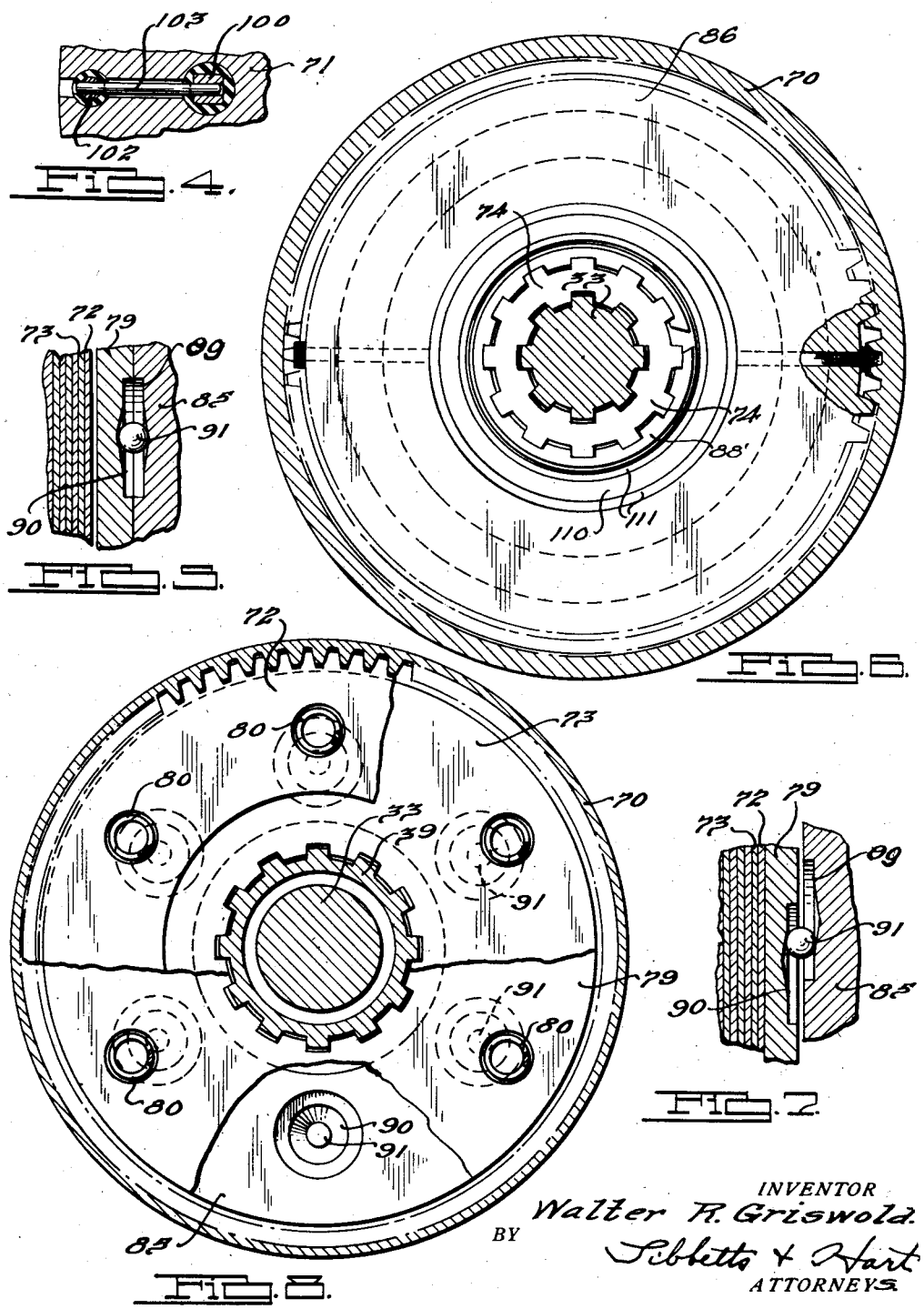

April 14, 1942.   W. R. GRISWOLD   2,279,986
MOTOR VEHICLE
Filed May 13, 1938    5 Sheets-Sheet 4
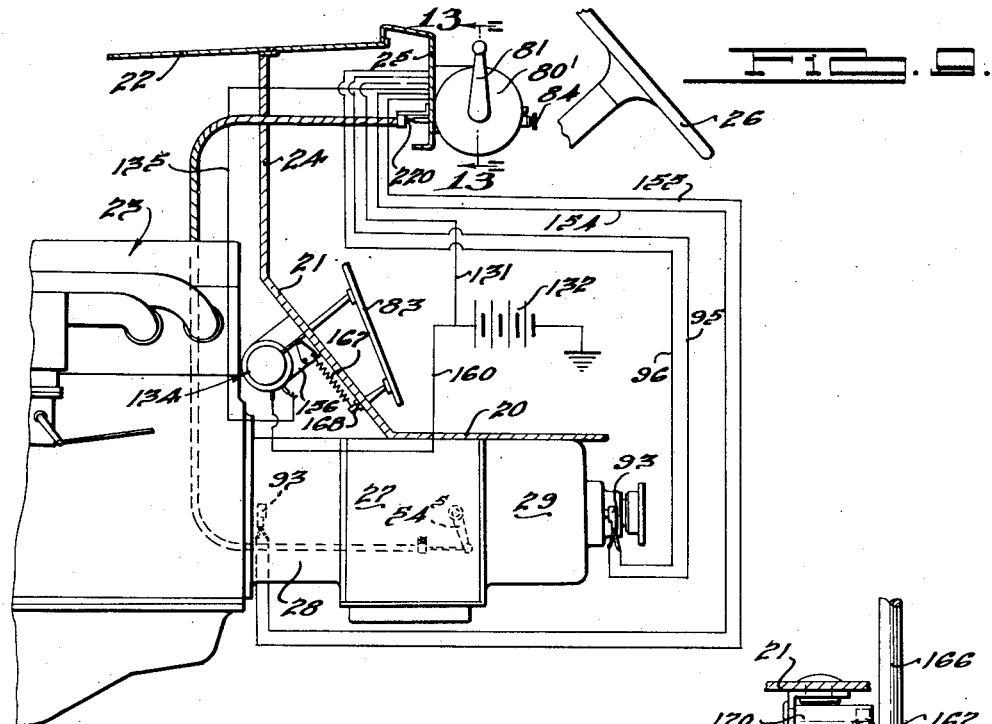
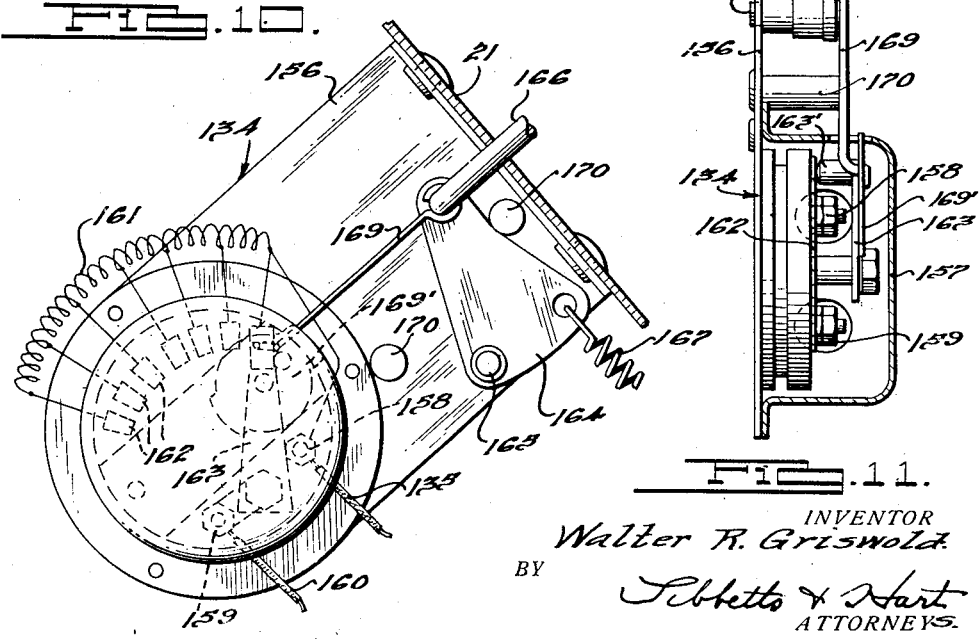
INVENTOR
Walter R. Griswold
BY
Tibbetts & Hart
ATTORNEYS April 14, 1942. W. R. GRISWOLD 2,279,986
MOTOR VEHICLE
Filed May 13, 1938 5 Sheets-Sheet 5
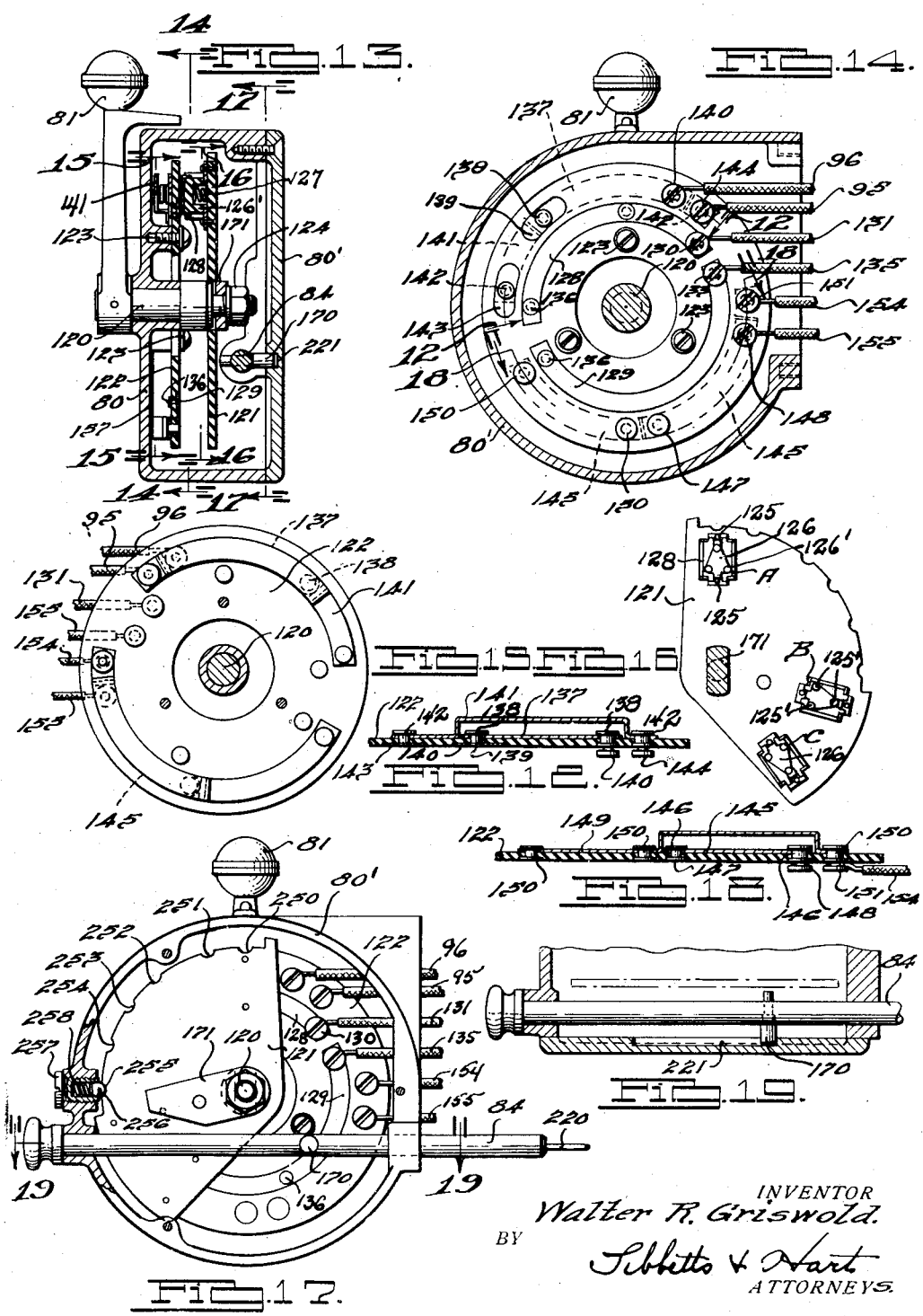
INVENTOR
Walter R. Griswold.
BY
Sibbetts & Hart
ATTORNEYS.

Patented Apr. 14, 1942

2,279,986

UNITED STATES PATENT OFFICE 2,279,986

MOTOR VEHICLE

Walter R. Griswold, Detroit, Mich., assignor to Packard Motor Car Company, Detroit, Mich., a corporation of Michigan Application May 13, 1938, Serial No. 207,750

11 Claims. (Cl. 74—365)

This invention relates to the transmission of power and more particularly to change speed mechanism for use with road vehicles.

An object of the invention is to provide change speed gearing in which the speed ratio can be varied silently.

Another object of the invention is to provide a compact change speed mechanism in which three pairs of constant mesh gears can be controlled to transmit power at any one of four speed ratios.

Another object of the invention is to provide a physically controlled magnetically responsive mechanism for selecting the speed ratio of motor vehicle gearing that will quickly and efficiently move selected clutches into and out of effective relation.

Another object of the invention is to provide magnetically operated clutch shifting mechanism for motor vehicle change speed gearing that can be readily controlled with a minimum effort by the vehicle driver.

Another object of the invention is to provide an electrically controlled change speed mechanism in which forward drive is locked out while reverse drive is effective.

Still another object of the invention is to provide a manual control that will function to shift a reverse idler gear into and out of effective driving position and that will also make an electrical contact while moving the reverse gear into effective position to establish the drive through the reverse idler.

Another object of the invention resides in the details of the mechanism for selectively controlling the energization of magnets that actuate clutch mechanisms associated with change speed gearing.

Another object of the invention resides in the control of a rheostat associated with an electrical system for selectively operating a plurality of clutches in a change speed mechanism.

Still another object of the invention is to provide a magnetic clutch controlled change speed mechanism that is compact and efficient.

Still another object of the invention is to provide a compact change speed gearing mechanism in which four clutches can be selectively controlled to produce any one of four forward speed ratios or a reverse drive between two shafts.

Other objects of the invention will appear from the following description taken in connection with the drawings, which form a part of this specification, and in which:

Fig. 1 is a sectional view through a motor vehicle change speed mechanism constructed in accordance with the invention;

Fig. 1A is a fragmentary sectional view through the gearing illustrating the shiftable reverse idler and a portion of its control mechanism;

Fig. 2 is a fragmentary section through the rear clutch mechanisms of the change speed mechanism taken on line 2—2 of Fig. 1;

Fig. 3 is a sectional view of one of the contact plugs taken on line 3—3 of Fig. 2;

Fig. 4 is a sectional view of one of the wiring connecting mechanisms taken on line 4—4 of Fig. 2;

Fig. 5 if a fragmentary sectional view of the servo-mechanism for operating one of the clutches, shown in clutch releasing position, taken on line 5—5 of Fig. 2;

Fig. 6 is a sectional view through one of the clutch mechanisms taken on line 6—6 of Fig. 1;

Fig. 7 is a view similar to Fig. 5 but showing the servo-mechanism in clutch engaging position;

Fig. 8 is a sectional view of one of the clutch mechanisms taken on line 8—8 of Fig. 1;

Fig. 9 is a longitudinal vertical sectional view of a front portion of the motor vehicle showing the clutch control mechanism;

Fig. 10 is a side elevational view of the rheostat arranged in the clutch control system;

Fig. 11 is a plan view of the rheostat partly broken away;

Fig. 12 is a sectional view on line 12—12 of Fig. 14 showing a portion of a switch mechanism;

Fig. 13 is a sectional view taken on line 13—13 of Fig. 9 showing the switch mechanism for controlling the clutches;

Fig. 14 is a section of the switch mechanism taken on line 14—14 of Fig. 13;

Fig. 15 is another sectional view of the switch mechanism taken on line 15—15 of Fig. 13;

Fig. 16 is another sectional view of the clutch mechanism taken on line 16—16 of Fig. 13;

Fig. 17 is another sectional view of the switch mechanism taken on line 17—17 of Fig. 13;

Fig. 18 is a sectional view of the switch mechanism taken on line 18—18 of Fig. 14;

Fig. 19 is another sectional view of the switch mechanism showing the reverse control means in associated relation therewith.

The change speed mechanism and the control therefor to which this invention relates can be applied to motor vehicles of conventional design and only the parts of the vehicle necessary for explaining the invention are illustrated. In Fig. 9, the floor 20 of the vehicle body terminates forwardly in toe board 21, and between the toe board and the hood 22 for the engine 23 extends the dash 24. Rearwardly of the dash is an instrument board 25 and the steering wheel 26 is associated with the vehicle in the usual manner.

Extending rearwardly from the engine and connected in unitary relation therewith is a casing structure enclosing change speed mechanism that is supported on the vehicle in any conventional manner. The casing is composed of a central gearing compartment 27 and similar front and rear clutch compartments 28 and 29. A drive shaft 30, connected to be rotated by the engine, projects into the front clutch compartment 28. A driven shaft 32 projects into the rear clutch compartment 29, and between the drive and driven shafts extends an intermediate shaft 33 arranged in axial alignment therewith. The forward end of the intermediate shaft is recessed to receive the rear end of the drive shaft and roller bearings 34 are interposed between such telescoping ends. The driven shaft is supported by bearing 35 carried between the rear wall of the gearing casing, and such shaft is recessed at its forward end to receive the thrust balls 36 with which the rear end of the intermediate shaft engages.

On the central portion of the intermediate shaft is fixed a gear 37 and sleeves 38 and 39 are mounted to rotate on the intermediate shaft on opposite sides of the gear 37. On the end of sleeve 38, adjacent gear 37, is fixed a gear 40 and on the end of sleeve 39, adjacent gear 37, is fixed a gear 41. Suitable roller bearings, as indicated at 42, are interposed between the intermediate shaft and the sleeves thereon and a ball bearing 43 is arranged between the gear 40 and the intermediate shaft. Walls 45 separate the gear compartment from the clutch compartments, and between the forward of such walls and the sleeve 38 is a ball bearing 44. Thrust bearing ring means 46 is interposed between gears 37 and 41. The sleeves extend through the adjacent end walls of the gearing compartment into the clutch compartment for driving connection with clutch mechanisms.

The counter or lay shaft is in the form of a hollow spool mounted to rotate on an arbor 47 and on this spool is formed a cluster of gears 48, 49, 50 and 51. Between the spool and the arbor is arranged ball bearing 52 and roller bearing 53. The gear 48 is in constant mesh with gear 40, gear 49 is in constant mesh with gear 37, and gear 50 is in constant mesh with gear 41. These pairs of gears are arranged to provide different speed ratios and can be selected to drive the vehicle forwardly at four different speed ratios.

As shown in Figs. 1 and 1A, gear 51 is in line with gear 55 on the forward end of sleeve 56, such sleeve encircling a portion of sleeve 39 and being spaced therefrom by suitable sets of bearing rollers 57. A reverse idler gear 54 is mounted in the casing on shaft 54' and is arranged to be moved axially by the fork 54² fixed on shaft 54³ extending through the casing and adapted to be rotated by an arm 54⁵ at the exterior of the casing. This idler gear when moved into mesh with gears 51 and 55 provides a reverse drive and when moved out of mesh with such gears the reverse drive is disconnected. Between the gears 55 and 41 are thrust rings 58, and between the sleeve 56 and bushing 59 that is carried by the rear gearing casing wall is a roller bearing 60. Sleeve 56 projects into the compartment containing the rear clutch mechanisms and is keyed to the rear clutch drum 70. Suitable oil sealing means, as indicated at 61, is provided to prevent oil in the gearing compartment and from around the driven shaft from passing into the clutch compartments.

The selection of the drive through the change speed gearing from the drive shaft to the driven shaft is effected by the positions of dual clutch mechanisms arranged in each clutch compartment. In the front clutch compartment there is a drum 62 having a forwardly extending sleeve portion 63 splined to the drive shaft, the inner peripheral face of the drum being grooved in an axial direction to receive projections on the peripheries of two series of clutch plates 64 and 65. These clutch plates are of relatively large diameter and are preferably formed of sintered bronze, such material being adapted to receive high pressure without burning or freezing. A sleeve 66 is splined on the forward end of the intermediate shaft within this drum and has axially extending grooves in its periphery to receive projections on the steel disk clutch plates 67 that are arranged alternately with respect to and cooperate with the clutch plates 64, such arrangement serving as the drive from the driven shaft directly to the intermediate shaft and is hereinafter referred to as the first clutch. The forward peripheral end portion of sleeve 38 is formed with axially extending grooves into which projections of the steel clutch disks 68 engage, such disks being arranged in alternate relation with disks 65 and engage therewith to clutch the sleeve 38 directly to the drum 62 fixed on the drive shaft, such clutch mechanism being referred to hereinafter as the second clutch.

Drum 70, splined to the rear end of sleeve 56, has fixed to its rear end a driving plate 71 formed as an integral part of the front end of driven shaft 32. The interior of the peripheral wall of this drum is grooved in an axial direction for the reception of projections on the two series of sintered bronze clutch disks 72 and 76, and the rear end of sleeve 39 projecting into the drum is formed with axially extending splines to receive projections on a series of steel clutch disks 73 arranged in alternate relation with the clutch disks 72, such arrangement of disks 72 and 73 being hereinafter referred to as the third clutch. Splined to the rear end of the intermediate shaft 33, within drum 70, is a sleeve 74 having axially extending grooves receiving the projections on a series of steel clutch disks 75 arranged alternately with the clutch disks 76, the disks 75 and 76 being referred to hereinafter as the fourth clutch.

Through a selected control of these four clutches, power may be transmitted from the drive shaft to the driven shaft through the constant mesh change speed gearing to provide four forward speed ratio drives and through the shiftable idler 54 to provide a reverse drive. Due to the constant meshing relation of the gearing there will be no clashing thereof in shifting from one forward speed ratio to another. An overdrive is obtained by engaging the second and fourth clutches so that power is transmitted from shaft 30 to drum 62, the second clutch, gears 40, 48, 49 and 37, shaft 33, sleeve 74, the fourth clutch and drum 70 to shaft 32. Direct drive is obtained by engaging the first and fourth clutches so that power transmission is from shaft 30 to drum 62, the first clutch, sleeve 66, shaft 33, sleeve 74, the fourth clutch and drum 70 to shaft 32. The next to the lowest speed ratio is obtained by engaging the second and third clutches so that power is transmitted from shaft 30 to drum 62, the second clutch, gears 40, 48, 50 and 41, the third clutch and the drum 70 to shaft 32. Low speed ratio is obtained by engaging the first and third clutches so that power is transmitted from shaft 30 to drum 62, to the first clutch, sleeve 66, shaft 33, gears 37, 49, 50 and 41, sleeve 39, the third clutch and drum 70 to shaft 32. Reverse drive is obtained, after the idler 54 has been moved into mesh, by engaging the first clutch so that power is transmitted from shaft 30 to drum 62 through the first clutch, sleeve 66, shaft 33, gears 37, 49, 51, 54 and 55, sleeve 56 and drum 70 to shaft 32. It will be noted that the third clutch includes a greater number of disks than the other clutches because of the greater torque to which it is subjected when effective.

Between the shaft 30 and the sleeve 66 is arranged a ball bearing 77 having races that are fixed against axial displacement from the shaft and sleeve by snap rings 78. Such bearing structure also serves to retain the driving shaft and the drum 62 in a definite axial relation. Extending through the drive shaft is a rod 200 having a pointed end projecting into a recess 201 in the intermediate shaft and engaging a radial pin 202 for holding a ball 203 in a recess in the splined sleeve 66. The rod 200 is screwed tightly into the driving shaft after the sleeve and intermediate shaft are in desired position to tightly hold the ball in the recess and thereby lock the sleeve 66 and the intermediate shaft in a definite axial relationship. At the exterior ends of each of the four clutch mechanisms is arranged a backing plate 78, and at the interior end of each of the series of disks in each of the clutch mechanisms is a pressure plate 79. The backing plate of the first clutch is splined to the sleeve 66 and the backing plate of the second clutch is splined to the sleeve 38. The backing plate of the third clutch is splined to sleeve 39 and the backing plate of the fourth clutch is splined to sleeve 74.

Between the two front clutches and the two rear clutches is arranged similar mechanism for moving the pressure plates in a direction to engage the clutch disks in driving engagement, the disks in each clutch have aligned openings therein to receive coil springs 80 bearing at one end against the pressure plate and at the other end against the bearing plate to normally disengage the disks, see Figs. 2 and 8.

The clutch engaging mechanisms are preferably of a servo-type and are actuated by physically controlled power means. On the dash is fixed a casing 80' within which is housed switch mechanism that can be shifted by a handle 81 to control magnetic means for actuating the clutch operating mechanisms, such handle being within convenient reach of the vehicle driver. In the magnetic actuating system is a rheostat, indicated generally at 134, controlled by a pedal 83 mounted on the toe board. The handle 81 can be operated to obtain a neutral position of all the clutches, and any one of four forward speed ratio driving relations in the gearing. The reverse drive is obtained by manually operated shifting mechanism for moving the idler 54 into engagement with gears 51 and 55, and such manually controlled mechanism controls the switch mechanism to cause actuation of the desired clutch for such drive.

Within each drum 62 and 70 and between the pressure plates therein is a pair of axially fixed actuator ring members 85 having an armature ring 86 axially movable therebetween. The armature ring has peripheral teeth 87 engaging in the recesses in the inner face of the associated drum providing a positive driving connection therewith. The actuator rings have a press fit with ball bearings 88, the bearing of the ring for the first clutch being mounted on sleeve 66, the bearing of the ring for the second clutch being mounted on sleeve 38, the bearing of the ring for the third clutch being mounted on sleeve 39, and the bearing of the ring for the fourth clutch being mounted on sleeve 74. Fixing each of the ball bearings axially on their mounting is a pair of resilient split rings 88' engaging in annular grooves in the mounting. In order to provide a quick clutch response and desirable high pressure of the adjacent disks in each set, servo-mechanism is arranged between each pressure plate and the associated actuator ring. Recesses 89 are formed in the pressure plates and recesses 90 are formed in the actuator rings, such recesses being similar and arranged in adjacent faces of the plates and rings to form pockets for carrying balls 91. Such recesses are formed so that they are inclined to a plane normal to the axis of the plates and rings, thus the depth of the recesses increases toward their centers. The clutches are normally disengaged by the springs 80 exerting pressure against the pressure plate urging them toward their actuator rings where the balls will lie in the deepest portions of the recesses, as best shown in Fig. 5, in a relation allowing the disks of each clutch to be disengaged. But when there is a relative rotation between an actuator ring and its adjacent pressure plate then such movement will move the ball toward a more shallow part of the recess, as shown in Fig. 7, and will wedge the pressure plate axially away from the actuator ring thus overcoming the disengaging effect of springs 80 to engage the adjacent disks in a firm driving relationship.

The actuator rings 85 are magnetically controlled through an electrical system under manual regulation. In the front end of the forward clutch compartment wall and in the rear wall of the rear clutch compartment are openings 92 for receiving plugs 93. In the inner end portion and projecting from each of such plugs is a pair of brush members 94 that are connected by wires 95 and 96 through conventional means 97 within the plug. The front and rear plugs are similar and the connections leading from the plugs to the four clutch mechanisms are similar so a description of one will suffice for all. A pair of spaced contact rings 98 are carried by insulator ring plugs 99 fixed in recesses in the wall of the drum, such rings being carried in a relation to be engaged by the brushes 94. The contact rings bear against contact elements 100 with which connecting means leading to each control system is associated, contact elements 100 being arranged in different plugs 99 that are 180° apart. Fig. 2 best shows the details of the connections leading from one of the plugs to one of the clutches and the connection for the fourth clutch is illustrated.

Into the wall 71 is inserted a plug 101 carrying therein a hollow contact element 102, and connecting elements 100 and 102 is a pin 103 having slotted spring ends engaging therewith. Another plug 104 of insulation material extends into the peripheral wall of the drum 70 and carries a headed contact pin 105, the shank of such pin telescoping into the hollow contact element 102 when the parts are assembled. A wire 106 has an end extending into plug 104 and held in contact with the head of pin 105 by a set screw 107. Current can flow from the upper brush, shown in Fig. 2, to the collector ring 98 and from such ring through elements 100, 103, 102 and 105 to the wire 106. This wire extends through an opening 108, extending radially in the armature 86, and is fixed to a contact ring 109 that engages a ring brush 110. Ring 109 is molded in an insulator member 111 and brush 109 is molded in an insulator member 112. Fixed in the actuator ring 85 is a non-magnetic housing 113 that contains a solenoid 114 and the latter is connected with brush 110 by wire 115. A ground wire 116 leads from the solenoid to the associated actuator ring 85. The pair of associated ring brushes 109 and 110 are held in contact by means of coil springs 117 engaging one of the insulator members 112 at one end and a flange of the third clutch actuator ring at the other end. It will be noted that the member 112 is mounted to rotate with the adjacent actuator ring 85 and that the member 111 is mounted to rotate with the armature, the same being held in such relationship in any suitable manner.

When the wire 96 is energized the current passes through wire 106, contact members 109 and 110 and wire 115 to the solenoid 114. The solenoid thus is energized to attract the armature ring 86 so that the actuator 85 will be held to rotate therewith, and the balls 91 will be caused to roll into the shallower portions of the depressions 90 and thereby establish an axial wedging relation with respect to the pressure plate 79 moving it axially toward the rear and thereby pressing the clutch disks 75 and 76 in driving relation so that the drum 70 and shaft 33 rotate together. Through similar structure associated with the other three clutches the drive can be transmitted from the drive shaft to the driven shaft at the desired speed ratio. Thus by selectively energizing the wiring system leading to the clutch mechanisms, the clutches can be magnetically actuated to provide any desired one of the four speed ratios, or the reverse drive when the idler 54 is moved into mesh.

The wiring for the clutch actuation is controlled physically by switch mechanism arranged within the casing 80'. Handle 81 is fixed to a shaft 120 extending into and mounted in the switch casing and fixed on this shaft by a nut 124 is a contact carrier segment 121 formed of steel. A contact carrying disk plate 122, formed of insulation material, is fixed against bosses in the casing by screws 123. The two carriers are arranged in parallel relation and on the face of the segment adjacent the disk are fixed three contact structures A, B and C, each consisting of a cage 128 fixed to the segment by pins 125 and carrying a base 126' formed of insulating material on which is clipped a contact plate 126 having three contacts 125', and a coil spring 127 urges the base in a direction toward the disk 122. In the path of movement of the contact 126 are two semi-circular contact strips 128 and 129 seated in recesses so that they will be flush with the side of the disk, such strips being secured to the disk carrier by rivets 136. Connected to the strip 128, at terminal 130, is a wire 131 leading directly to the vehicle battery 132 which is grounded to the vehicle frame, and connected to the strip 129 by terminal 133 is a wire 135 leading to a rheostat, indicated generally at 134.

Arcuate contact strips are carried by the fixed disk 122 adjacent its periphery and they are arranged on a surface spaced radially outwardly of the circle which the arcuate strips 128 and 129 occupy, such strips being on the opposite side of the disk from the contact strips 128 and 129. One of these arcuate contact strips 137 is fixed to the disk 122 by two rivets 138, one of the rivets having an elongated contact head 139 for engagement by one of the other contact structures on the segment and the other rivet having a terminal nut 140 thereon. Another of these contact strips 141 bridges the strip 137 and is fixed to the plate by a pair of rivets 142 that extends through the disk 122, one of such rivets having an elongated head 143 for engagement by the same contact member on the segment that engages the contact head 139 and the other of such rivets having a terminal nut 144 thereon. A contact strip 145 is fixed to the carrier disk by a pair of rivets 146, one of the rivets terminating in a head 147 and the other of such rivets having a terminal nut 148 thereon. Bridging strip 145 is another arcuate contact strip 149 secured to the carrier disk by three rivets 150 passing through the disk, two of these rivets forming contacts and the other having a terminal nut 151 fixed thereon.

Wire 96 is secured in contact with strip 137 by rivet 138 and terminal nut 140, and such wire leads to the rear plug 93 where it is connected to energize the magnet of the third clutch. Wire 95 is secured in contact with strip 141 by rivet 142 and terminal nut 144, and such wire leads to the rear plug 93 where it is connected to energize the magnet of the fourth clutch, as shown in Fig. 2. Wire 154 is secured in contact with strip 149 by rivet 150 and terminal nut 151, and such wire leads to the front plug 93 where it is connected to energize the magnet of the first clutch. Wire 155 is secured in contact with strip 145 by rivet 146 and terminal nut 148, and such wire leads to the front plug 93 where it is connected to energize the magnet for the second clutch.

In order that there will be a more gradual engagement of the clutches in changing speed ratios in the gearing, I provide in the electrical system a rheostat, indicated generally at 134 and best shown in detail in Figs. 10 and 11. Bracket 156 is fixed beneath the toe board 21 and fixed on this bracket is a cover 157 for enclosing the electrical system. There is a terminal 158 having the wire 135 connected thereto and a terminal 159 having a wire 160 leading from the wire 131 extending between the battery and the terminal 130 in the switch casing. Resistance wiring 161 is connected with a plurality of spaced terminals 162 and with terminal 158. A switch or contact arm 163 is pivotally connected in contact with terminal 159 and carries a contact element 163' arranged to be swung therewith to progressively engage the terminals 162 so that when moved from left to right, as viewed in Fig. 10, the current will be gradually stepped up.

The contact arm 163 is operated by mechanism under physical control of the pedal 83. Such actuating mechanism includes a triangular plate 164 having a pivot 165 connecting one corner thereof to the bracket 156 above the casing 157. A rod 166 is connected to another corner of the plate 164 and to the pedal 83. Coil spring 167 connects the third corner of the plate 164 with a boss 168 extending beneath the toe board. Connecting the rod 166 with the contact arm is a link 169 engaging a plate of insulating material 169' riveted to the arm 163. Projecting from the bracket 156 are pins 170 for limiting the pivotal movement of the plate 164 so that the contact arm will not be moved beyond the range of the terminals 162. Spring 167 normally serves to move the contact arm from left to right, as viewed in Fig. 10, thus normally moving it to the position of least resistance of current flow. When resistance to curent flow is desired, the pedal 83 is pressed down moving the contact arm toward the left, as viewed in Fig. 10, and thereby establishing the desired resistance to the current flow from the battery to the magnet of the first and second clutches when they are energized by the switch mechanism.

As previously explained, the idler gear 154 is shifted axially into and out of mesh with gears 51 and 55 to establish or disconnect the reverse drive and this shifting is done by physically operable means engageable by the driver. In the present instance such physically operable idler shifting mechanism is utilized to control the switch mechanism for engaging the clutch mechanism required for such drive and at the same time it is utilized to maintain the switch mechanism in position establishing reverse drive so that no other clutches can be engaged during reverse drive. To this end the rod 84 is mounted in suitable bearings in the switch housing 80' with a knob at its extreme end which can be grasped for operation by the vehicle driver. Such rod is arranged to be reciprocated and has fastened thereto a Bowden wire 220 that is connected to operate the arm 54⁵, such wire extending through suitable guides on the vehicle. Within the switch casing and extending through the rod 84 is a pin 170 having one end extending into a groove 221 in the switch casing wall to guide the rod and prevent its rotation. The opposite end of this pin 170 is arranged to cooperate with an arm 171 fixed to shaft 120 so that it will thereby strike the arm to move the contact segment 121 into position energizing the reverse clutch mechanism if such segment is in any of its positions establishing forward drives, and as long as the rod 84 is held out to maintain the reverse idler in driving relation the pin will lie under the arm 170 so that it will be impossible to move the contact carrying segment to any other position than neutral or reverse drive position. Of course when the rod is pushed inwardly to shift the idler 54 out of engagement, then the pin 170 moves out of the path of arm 170 so that the segment 121 can be moved by the handle 81 into any desired forward drive contact relationship.

The contact carrying segment 121 is provided on its periphery with a plurality of depressions 250, 251, 252, 253, 254 and 255 arranged to receive a detent ball 256. This ball is carried by a hollow member 257 screwed through the wall of the switch casing, and a coil spring 258 within the hollow member is arranged to urge the ball into engagement with the periphery of the segment. The recesses are arranged in spaced relation and are located so that the ball will engage therein to maintain the segment in its various positions of adjustment to energize the several clutches. When the segment is in the position shown in Fig. 17 with the ball detent engaging recess 255, the contact members on the segment will be in ineffective positions thus establishing a neutral or unenergized condition for the clutch mechanisms. When the handle 81, as viewed in Figs. 14 and 17, is moved to the left so that the ball detent engages in recess 254, then reverse drive will be established through the contact member B engaging one of the contact elements 150 on strip 145 and the contact strip 129 thus making a circuit from the battery to the rheostat to wire 154 leading to the magnet of the first clutch. In such position of the segment only the first clutch mechanism is magnetized and the drive will be established as hereinbefore described. When the segment is moved to a position where the ball detent 256 engages the recess 253, then the first and third clutches will be engaged because the contact members A and C will establish circuits, the contact member A connecting the strip 128 with strip 137 through contact 138, and contact member C will connect the contact strip 129 with the strip 145 through contact element 150 thereby connecting wire 96 leading to the third clutch with the battery and connecting the rheostat with wire 154 of the first clutch. This connection of the first and third clutches will establish the low direct speed ratio previously described. When the segment is moved so that the ball detent engages the recess 252 the second and third clutches will be energized so that the drive through the gearing will be in second forward speed ratio, such ratio in this instance being between low forward speed and direct forward speed. In this instance the contact member A will engage the terminal 138 and the strip 128 thus connecting the wire 96 with the battery and the contact member C will engage strip 129 and contact element 147 connected with wiring 155 leading to the second clutch. To obtain direct drive through the gearing the first and fourth clutches are energized and to accomplish this the segment is moved so that the ball detent 256 engages in the recess 251. In this instance the contact member A engages the contact 143 and the strip 128 thus connecting the fourth clutch with the battery through the wiring 95, and the contact member B engages with the strip 129 and the contact 150 to connect wiring 154 with the rheostat. To obtain an overdrive through the gearing, segment 121 is moved to a position where the ball detent 256 engages in the recess 250 whereupon the second and fourth clutches will be engaged. This is accomplished because the contact member A engages strip 129 connected with the battery and terminal 143 connected with wiring 95 leading to the fourth clutch, and contact member B will engage strip 129 connected to the rheostat and contact element 147 connecting the wire 155 leading to the second clutch.

It will be noted that the pin 170 and the arm 171 are so related that when the rod 84 is pulled out shifting the idler reverse gear into operative position, the segment if in a forward drive establishing position will be moved to a position where the ball detent will engage in recess 255 and the pin will prevent the arm from being moved downwardly into any one of the forward speed ratio producing positions as long as the rod 84 remains pulled out to obtain reverse drive. The reverse rod 84 thus serves to shift the idler into driving relation and to regulate the electrical system so that the clutch is automatically moved into engagement to produce the reverse drive. If the segment 121 is in position to establish reverse drive the handle 81 can be moved to the position shown in Fig. 17 which deenergizes all of the driving contacts, and with the rod 84 pulled out for reverse drive the handle can be moved to swing the segment 121 from neutral position into reverse drive position.

It will be seen that the change speed gearing and clutches provide a small compact structure and the necessity of a main clutch usually employed between the engine and the drive shaft is eliminated. The control for the clutch mechanism can be readily adjusted by the driver of the vehicle through moving the lever 81 to control a switch mechanism whereupon the drive will be automatically established.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. A change speed mechanism comprising a drive shaft, an intermediate shaft, a driven shaft, said shafts being in coaxial relation, a gear fixed on the intermediate shaft between the ends thereof, a pair of sleeves rotatably mounted on the intermediate shaft one on each side of the gear fixed thereon, a gear fixed on the end of each sleeve adjacent the gear on said intermediate shaft, clutch means secured to the other end of each sleeve, clutch means secured to the opposite ends of the intermediate shaft, clutch means secured to said drive shaft and operable to engage the adjacent clutch means on the intermediate shaft or the clutch means on the adjacent sleeve, clutch means secured to said driven shaft operable to engage the other intermediate shaft clutch means or the other sleeve clutch means, a lay shaft parallel with the intermediate shaft, gears fixed on said lay shaft meshing with the gears on said sleeves and said intermediate shaft, a reverse gear fixed on said lay shaft, an outer sleeve loosely mounted on the sleeve nearest said driven shaft and fixed to the clutch means on the driven shaft, a reverse gear fixed on said outer sleeve, a slidable gear for engaging with said reverse gears, with said slidable gear, means for selectively engaging the clutch means associated with the drive and driven shaft and the sleeves, and means for shifting said slidable gear into and out of engagement with said reverse gear.

2. A change speed mechanism comprising a drive shaft, a driven shaft, an intermediate shaft, said shafts being coaxial, drums fixed one to the adjacent ends of said drive and driven shafts and telescoping the ends of said intermediate shaft, a gear fixed on said intermediate shaft between said drums, a pair of sleeves loosely mounted one on each end of said intermediate shaft and having one end projecting into the adjacent drum, a gear fixed on each sleeve adjacent the gear on said intermediate shaft, a lay shaft parallel with the intermediate shaft, gears fixed on said lay shaft in mesh with said sleeve gears and the gear on said intermediate shaft, a sleeve fixed to the drum on the driven shaft, a gear fixed to said last mentioned sleeve, a gear fixed on said lay shaft, a shiftable gear for drivingly connecting said last mentioned gear and the gear on the sleeve fixed to the drum, and clutch means in each drum for drivingly connecting them with either the adjacent loosely mounted sleeve or with the adjacent end of the intermediate shaft.

3. In a transmission mechanism having gearing including a shiftable idler for effecting a forward or reverse drive and magnetically shiftable clutches for selecting the drive, the combination of a manually shiftable switch for controlling the clutches, a manually operable means for shifting the reverse idler into and out of driving position in the gearing, and means operative with said reverse idler shifting means for locking said switch from movement to establish forward drive when said idler is in driving position.

4. In a transmission mechanism having gearing including a shiftable idler for effecting a forward or a reverse drive and magnetically controlled clutches for selecting the drive, the combination of a manually shiftable switch for selectively energizing or deenergizing the clutches, a shift rod for the reverse idler, and means on the rod for moving said shiftable switch into position controlling the clutches to establish reverse drive upon movement of the rod to engage the reverse idler.

5. In a transmission mechanism having gearing including a shiftable idler for effecting forward or reverse drive, the combination of magnetically controlled clutches for establishing the drive through the gearing, switch mechanism for controlling the actuation of the clutches, shift means for the idler, and means on the shift means for shifting the switch mechanism from forward drive position to reverse drive position.

6. In a change speed mechanism having clutch controlled gearing for establishing a plurality of forward speed ratio driving connections and a shiftable reverse idler in the gearing, the combination of a reverse gear idler shift lever, a switch means for controlling the clutches, and cooperating mechanism on said lever and switch means for locking said switch means from being moved into a position effecting a forward drive connection when the reverse idler is in driving relation.

7. In a change speed mechanism having gearing through which a plurality of speed ratios are selectively established by clutches and a shiftable reverse idler in the gearing, the combination of mechanism for controlling the clutches including a movable switch element, a lever for shifting the reverse idler, and cooperating means connected with said lever and said switch element for shifting the switch element out of any position establishing a forward drive when said lever is moved to place said idler in effective driving position.

8. In a change speed mechanism having gearing through which a plurality of speed ratios are selectively established by clutches and a shiftable reverse idler in the gearing, the combination of a switch casing having a recessed wall, a movable contact carrying switch member in the casing for controlling the clutches, a lever slidable in the switch casing for shifting the reverse idler, a pin extending through the lever and engaging in the casing recess, and an element fixed to move with said switch element in the path of said pin, said pin engaging said element to move said member out of any forward drive establishing position and preventing its movement back into any such position when the lever is shifted to place the idler in effective driving position.

9. A driving mechanism comprising a drive shaft, a driven shaft, an intermediate shaft coaxial with said drive and driven shafts, a drum fixed to said drive shaft, a drum fixed to said driven shaft, a gear on the central portion of said intermediate shaft, a sleeve on the intermediate shaft on opposite sides of the gear and each having a gear fixed to the end adjacent said gear, said sleeves extending into the adjacent drum, a gear fixed to the driven shaft drum and mounted to rotate on the adjacent sleeve, a shiftable reverse idler for engaging the last mentioned gear, a lay shaft having gears thereon meshing one with each of the sleeve gears and the intermediate shaft gear, another gear on the lay shaft positioned to be engaged by the idler, a clutch mechanism in each drum for engaging the same with the sleeve therein, a clutch mechanism in each drum for engaging the same with the intermediate shaft extending therein, means for shifting said idler, and means for selectively engaging said clutches.

10. In a change speed mechanism having gearing including a reverse idler through which a plurality of speed ratios are selectively established by clutch means, the combination of a movable switch means operable to selectively control the actuation of the clutch means, means for placing the reverse idler into and out of effective relation in the gearing, and means under control of said idler control means for shifting said switch means to select the clutch means establishing reverse drive through the gearing.

11. In a change speed mechanism, a driven shaft, a drum fixed to the driven shaft, a power shaft extending into the drum in axial relation with the driven shaft, clutch means in the drum adapted to establish a driving connection between the power shaft and the drum, a sleeve loosely mounted on the power shaft and extending into the drum, a gear fixed on the sleeve, clutch means in the drum adapted to establish a driving connection between the sleeve and the drum, a gear fixed to the drum and loosely mounted on the sleeve, a driven lay shaft, gears on the lay shaft, one of which meshes with the gear on the sleeve, a reverse drive idler gear adapted to drivingly connect the other gear on the lay shaft with the gear fixed to the drum, and means for selectively actuating said clutch means, said clutch means being disengaged when said reverse idler gear connects the gear on the lay shaft and the gear fixed to the drum.

WALTER R. GRISWOLD.